(12) United States Patent
Pang (10) Patent No.: US 12,222,066 B2
(45) Date of Patent: *Feb. 11, 2025

(54) FIXING CLIP (71) Applicant: ZHEJIANG TOPMB ELECTRICAL LIGHTING CO., LTD, Zhejiang Province (CN)

(72) Inventor: Lingling Pang, Zhejiang Province (CN)

(73) Assignee: ZHEJIANG TOPMB ELECTRICAL LIGHTING CO., LTD, Shaoxing (CN)

( * ) Notice: Subject to any disclaimer, the term of this patent is extended or adjusted under 35 U.S.C. 154(b) by 421 days.

This patent is subject to a terminal disclaimer.

(21) Appl. No.: 17/688,850

(22) Filed: Mar. 7, 2022

(65) Prior Publication Data

US 2022/0196205 A1    Jun. 23, 2022

Related U.S. Application Data (63) Continuation-in-part of application No. 17/027,389, filed on Sep. 21, 2020, now Pat. No. 11,268,653.

(30) Foreign Application Priority Data

Sep. 24, 2019 (CN) ......................... 201921592319.2
Mar. 7, 2022 (CN) ......................... 202220470940.7

(51) Int. Cl.
G06F 1/16 (2006.01)
F16M 11/04 (2006.01)
(Continued)

(52) U.S. Cl.
CPC ........ *F16M 13/022* (2013.01); *F16M 11/041* (2013.01); *F16M 11/10* (2013.01); *F16M 2200/041* (2013.01)

(58) Field of Classification Search
CPC .... G06F 1/1607; G06F 1/1609; G06F 1/1611; G06F 2200/1613; F16M 13/02; F16M 2200/041; F21V 21/088; F21V 33/0052
See application file for complete search history.

(56) References Cited

U.S. PATENT DOCUMENTS

5,082,235 A    1/1992   Crowther et al.
6,663,066 B1   12/2003  Hong
(Continued)

*Primary Examiner* — Bradley Duckworth
(74) *Attorney, Agent, or Firm* — Tarolli, Sundheim, Covell & Tummino LLP (57) ABSTRACT

The present invention discloses a fixing clip, which comprises an article connection structure, a first clamping body, a second clamping body and a counterweight structure arranged in sequence. The article connection structure is arranged on the first clamping body; the second clamping body and the first clamping body are relatively slidably connected to form a first clamping interval with adjustable clamping width; the end of the second clamping body is provided with a counterweight structure connecting piece, and the counterweight structure is installed on the counterweight structure connecting piece, wherein the counterweight structure and the counterweight structure connecting piece can be relatively rotated or fixed; the first clamping body includes a first clamping portion and a first sliding connection portion, and the first clamping portion and the first sliding connection portion form a clamping angle. The fixing clip comprises an adjusting cover.

14 Claims, 9 Drawing Sheets

(51) Int. Cl.
*F16M 11/10* (2006.01)
*F16M 13/02* (2006.01)

(56) References Cited

U.S. PATENT DOCUMENTS

| | | |
|---|---|---|
| 7,219,866 B2 | 5/2007 | Depay et al. |
| 7,431,253 B2 | 10/2008 | Yeh |
| 7,597,366 B2 | 10/2009 | Yang |
| 7,618,202 B2 | 11/2009 | Xiao et al. |
| 9,717,995 B2 | 8/2017 | Kliot et al. |
| 10,544,927 B2 | 1/2020 | Yen et al. |
| 10,900,646 B2 | 1/2021 | Yen et al. |
| 11,268,653 B2 * | 3/2022 | Pang ................. F16M 13/00 |
| 11,519,588 B2 * | 12/2022 | Pang ................... F16B 2/06 |
| 2006/0170817 A1 | 8/2006 | Wu |
| 2007/0212057 A1 | 9/2007 | Liang |

\* cited by examiner

FIXING CLIP

RELATED APPLICATIONS

This application is a Continuation-In-Part patent application of Nonprovisional application Ser. No. 17/027,389 filed Sep. 21, 2020, claiming the benefit and priority of Chinese Patent Application No. 202220470940.7 filed Mar. 7, 2022, entitled A Fixing Clip, which claims the benefit claiming priority to Serial No. CN 201921592319.2, filed on 24 Sep. 2019, the entirety of which is incorporated herein by reference.

TECHNICAL FIELD

The present invention relates to a fixing clip, in particular to a fixing clip with a wide range of clamping applications.

BACKGROUND ART

It is inevitable that we have to fasten some items into another item in our daily life. In order to make the items securely fastened, we usually use fixing clips, such as fixing an on-screen display lamp to a monitor. Taking the on-screen display lamp holder as an example, either the existing fixtures are suitable for a monitor with a thin frame, such as the monitor of a desktop computer, or suitable for a monitor with a thick frame, such as the monitor of a notebook computer, and it is not possible to have one applicable to both.

SUMMARY OF THE INVENTION

In order to overcome the deficiencies in the prior art, the present invention provides a fastener, which can be applied in a wide range.

In order to achieve the above objectives, the present invention adopts the following technical solutions:

A fixing clip includes an article connection structure, a first clamping body, a second clamping body and a counterweight structure arranged in sequence, and the article connection structure is used to connect articles to be fixed, and the article connection structure is arranged on the first clamping body;

the second clamping body and the first clamping body are relatively slidably connected to form a first clamping interval with adjustable clamping width;

the end of the second clamping body is provided with a counterweight structure connecting piece, and the counterweight structure is installed on the counterweight structure connecting piece, wherein the counterweight structure and the counterweight structure connecting piece can be relatively rotated or fixed, and a second clamping interval is formed between the counterweight structure and the second clamping body;

the first clamping body includes a first clamping portion and a first sliding connection portion, and the first clamping portion and the first sliding connection portion form a clamping angle, wherein a third clamping interval is formed between the clamping angle and the counterweight structure.

The fixing clip includes an adjusting cover.

During application of the present invention, different clamping intervals can be selected according to the shape and size of the clamped object.

Selection of the first clamping interval: the second clamping body and the first clamping body can be relatively slidably connected, and the relative distance between the second clamping body and the first clamping body is adjusted so that an adjustable clamping width is formed between the second clamping body and the first clamping body, so as to match the clamped objects with different thicknesses; and the adjusting cover further widens the using range of the first clamping interval.

Selection of the second clamping interval: the clamped object is placed between the second clamping body and the counterweight structure, and rotate the counterweight structure to clamp the object.

Selection of the third clamping interval: align the top of the clamped object with the clamping angle, and meanwhile rotate the counterweight structure to make it abut against the surface of the clamped object.

Further, the second clamping body includes a second clamping portion and a second sliding connection portion.

The adjusting cover includes a first adjusting cover detachably connected to the first clamping portion, and a second adjusting cover detachably connected to the second clamping portion.

By adopting the above-mentioned structure, in the state where the first adjusting cover is not installed on the first clamping portion, the first clamping interval is formed between the first clamping portion and the second clamping portion or the second adjusting cover.

In the state where the first adjusting cover is installed on the first clamping portion, the first clamping interval is formed between the first adjusting cover and the second clamping portion or the second adjusting cover.

In the state where the second adjusting cover is not installed on the second clamping portion, the first clamping interval is formed between the first clamping portion or the first adjusting cover and the second clamping portion.

In the state where the second adjusting cover is installed on the second clamping portion, the first clamping interval is formed between the first clamping portion or the first adjusting cover and the second adjusting cover.

At the same time, in the above-mentioned structure, in the state where the first adjusting cover is installed on the first clamping portion, since the first adjusting cover itself has a certain length, the distance between the article connection structure and the first clamping interval is farther than that when the first adjusting cover is not installed, and in this state, when the fixing clip is used for a screen hanging lamp, a light source can be farther away from the first clamping interval, which is particularly suitable for a curved screen of which the middle portion is farther away from a user side than the two ends.

Further, a plurality of first connecting grooves matching the first clamping portion are formed in the first adjusting cover, and the plurality of first connecting grooves are arranged in a direction close to or away from the second clamping portion.

A plurality of second connecting grooves matching the second clamping portion are formed in the second adjusting cover, and the plurality of second connecting grooves are arranged in a direction close to or away from the first clamping portion.

By adopting the above-mentioned structure, a user can adjust the distance between the first adjusting cover and the second clamping portion by means of matching of the first clamping portion with different first connecting grooves.

The user can adjust the distance between the second adjusting cover and the first clamping portion by means of matching of the second clamping portion with different second connecting grooves.

Further, a rubber pad is provided on the inner side of the first clamping portion, and a sliding groove and a sliding limiter is provided on the first sliding connection portion, the second clamping body includes a second clamping portion and a second sliding connection portion, a rubber pad is provided on both the left and right sides of the second clamping portion, the second sliding connection portion is provided with a slider, and the second clamping portion and the second sliding connection portion form a clamping angle along the relative sliding direction of the first clamping body and the second clamping body, the first sliding connection portion is provided with a first spring fixing member, the second sliding connecting portion is provided with a second spring fixing member, and a spring is arranged between the first spring fixing member and the second spring fixing member, whereby the second sliding connection portion is provided with a spring placement groove.

The first sliding connection portion and the second sliding connection portion constitute a sliding connection portion.

The first clamping body and the second clamping body adopt sliding grooves and sliders to realize relative sliding, and the provided springs increase the stability of securing the fixing clip.

Further, when the counterweight structure is rotated until the axis of the counterweight structure is parallel to the axis of the second clamping body, the linear distance from the end of the second clamping body to the location of the sliding connection portion is less than the linear distance from the end of the counterweight structure to the location of the sliding connection portion.

Further, the counterweight structure connecting piece is provided with an integral connecting portion and a counterweight connecting portion, wherein the integral connecting portion is used for connecting the second clamping body and the counterweight connecting portion, and the counterweight connecting portion is used for connecting the counterweight structure.

The counterweight structure connecting piece is provided with an integral connecting portion, so that a distance is formed between the second clamping body and the counterweight structure, to reserve a space for the clamped object.

Further, the counterweight structure is mounted on the counterweight connecting portion through a rotating rod, the counterweight connecting portion is a hollow cylinder, and the counterweight structure is provided with a connecting hole and a rotating groove, wherein the counterweight connecting portion is placed on the rotating groove, the rotating rod passes through the connecting hole and the counterweight connecting portion, and is fixed with a threaded structure.

The counterweight structure and the counterweight connecting portion rotate relatively through the rotating rod, and are fixed by a threaded structure, so that a damping force is formed between the counterweight structure and the counterweight connecting portion, and the counterweight structure is relatively fixed and positioned.

Further, the counterweight connecting portion is provided with a rotation limiting body.

Further, the shape of the counterweight structure is of small upper and large lower portion, so that the center of gravity of the counterweight structure is lowered, so the fixing clip is secured and stable.

Further, a rubber pad is provided on the inner side of the lower end of the counterweight structure.

Further, the article connection structure is rotatably arranged on the first clamping body.

By adopting the above-mentioned structure, the user can adjust the angle of the article connection structure, that is the angle of the article to be fixed, such as the light outgoing angle of the light source, by means of rotatable connection between the article connection structure and the first clamping body.

The fixing clip is particularly suitable for fixing items of lighter weight.

Compared with the prior art, the present invention has the following beneficial effects:

(1) The present invention has a simple structure, and is provided with a variety of clamping methods, with a wide range clamping application and has strong applicability.

(2) The clamping range of application can be wider by the addition of an adjusting cover.

DESCRIPTION OF ACCOMPANIED FIGURES

The corresponding reference numeral parts in the accompanied figures are: 1 Article connection structure; 2 Clamping angle; 3 Counterweight structure; 4 First clamping body.

5 Second clamping body; 6 First spring fixing member; 7 Second spring fixing member; 8 Spring; 9 Counterweight structure connecting piece; 10 Integral connecting portion; 11 Counterweight connecting portion; 12 First clamping portion; 13 First sliding connection portion; 14 Sliding groove; 15 Sliding limiter; 16 Second clamping portion; 17 Second sliding connection portion; 18 Slider; 19 Spring placement groove; 20 Rotating rod; 21 Rotating groove; 22 Rotation limiting body; 23 Adjusting cover; 25 Rubber pad; 26 First adjusting cover; 27 Second adjusting cover; 28 First connecting groove; 29 Second connecting groove; and 30 Strip-shaped lamp body.

DETAILED IMPLEMENTATION METHOD

The specific implementation method of the present invention will be described in further detail below in conjunction with the accompanied figures and embodiments. The following embodiments are used to illustrate the present invention, but not to limit the scope of the present invention.

As shown in FIGS. 1-5, a fixing clip includes an article connection structure 1, a first clamping body 4, a second clamping body 5 and a counterweight structure 3 arranged in sequence, and the article connection structure 1 is used to connect articles to be fixed, and the article connection structure 1 is arranged on the first clamping body 4.

The second clamping body 5 and the first clamping body 4 are relatively slidably connected to form a first clamping interval with adjustable clamping width.

The end of the second clamping body 5 is provided with a counterweight structure connecting piece 9, and the counterweight structure 3 is installed on the counterweight structure connecting piece 9, wherein the counterweight structure 3 and the counterweight structure connecting piece 9 can be relatively rotated or fixed, and a second clamping interval is formed between the counterweight structure 3 and the second clamping body 5.

The first clamping body 4 includes a first clamping portion 12 and a first sliding connection portion 13, and the first clamping portion 12 and the first sliding connection portion 13 form a clamping angle 2, wherein a third clamping interval is formed between the clamping angle 2 and the counterweight structure.

The fixing clip includes an adjusting cover 23.

The first clamping interval, the second clamping interval and the third clamping interval are set to adapt to different thicknesses and shapes of the clamped articles; and the adjusting cover 23 further widens the using range of the first clamping interval.

The counterweight structure 3 is used to balance the weight of the clamped and fixed object on the article connection structure 1, so that the fastener is balanced as a whole, to avoid unstable fixation caused by one side heavier weight.

Preferably, the second clamping body 5 includes a second clamping portion 16 and a second sliding connection portion 17.

Figure 1:
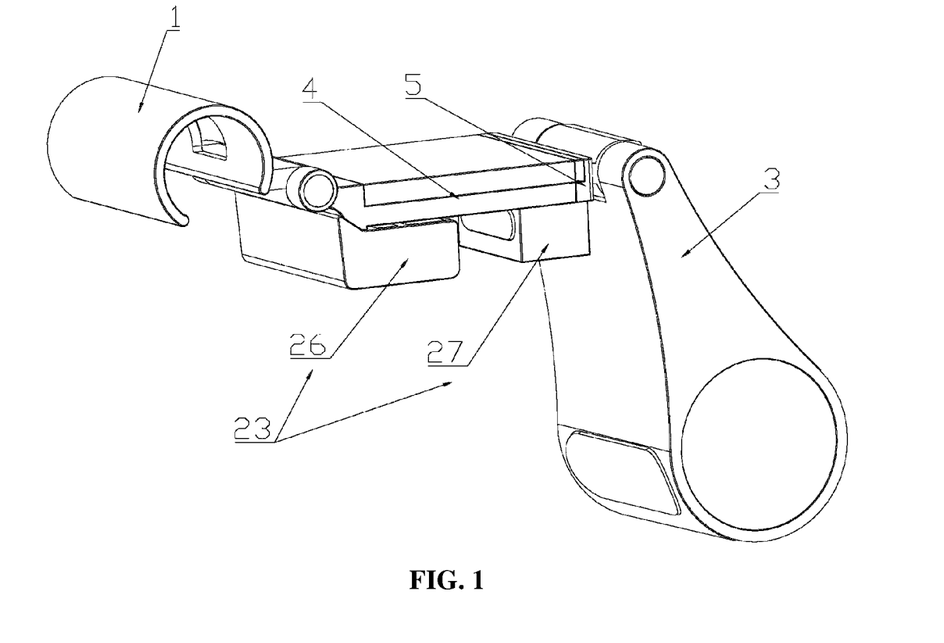
FIG. 1 is a schematic view of a three-dimensional structure of a fixing clip of the present invention.
Figure 2:
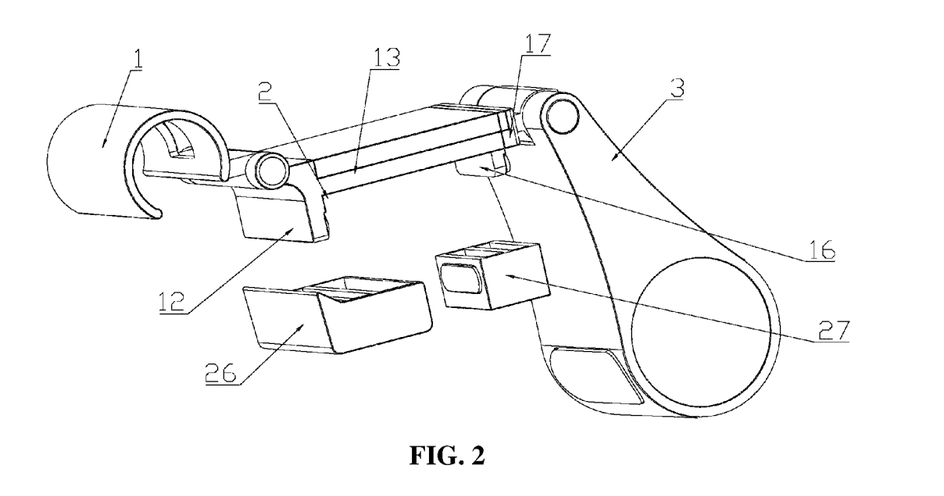
FIG. 2 is a schematic view of mounting and dismounting of a first clamping portion, a second clamping portion, a first adjusting cover and a second adjusting cover in the fixing clip of the present invention.

The adjusting cover 23 includes a first adjusting cover 26 detachably connected to the first clamping portion 12, and a second adjusting cover 27 detachably connected to the second clamping portion 16.

By adopting the above-mentioned structure, in the state where the first adjusting cover 26 is not installed on the first clamping portion 12, the first clamping interval is formed between the first clamping portion 12 and the second clamping portion 16 or the second adjusting cover 27.

In the state where the first adjusting cover 26 is installed on the first clamping portion 12, the first clamping interval is formed between the first adjusting cover 26 and the second clamping portion 16 or the second adjusting cover 27.

In the state where the second adjusting cover 27 is not installed on the second clamping portion 16, the first clamping interval is formed between the first clamping portion 12 or the first adjusting cover 26 and the second clamping portion 16.

In the state where the second adjusting cover 27 is installed on the second clamping portion 16, the first clamping interval is formed between the first clamping portion 12 or the first adjusting cover 26 and the second adjusting cover 27.

At the same time, in the above-mentioned structure, in the state where the first adjusting cover 26 is installed on the first clamping portion 12, since the first adjusting cover 26 itself has a certain length, the distance between the article connection structure 1 and the first clamping interval is farther than that when the first adjusting cover 26 is not installed, and in this state, when the fixing clip is used for a screen hanging lamp, a light source can be farther away from the first clamping interval, which is particularly suitable for a curved screen of which the middle portion is farther away from a user side than the two ends.

Figure 4:
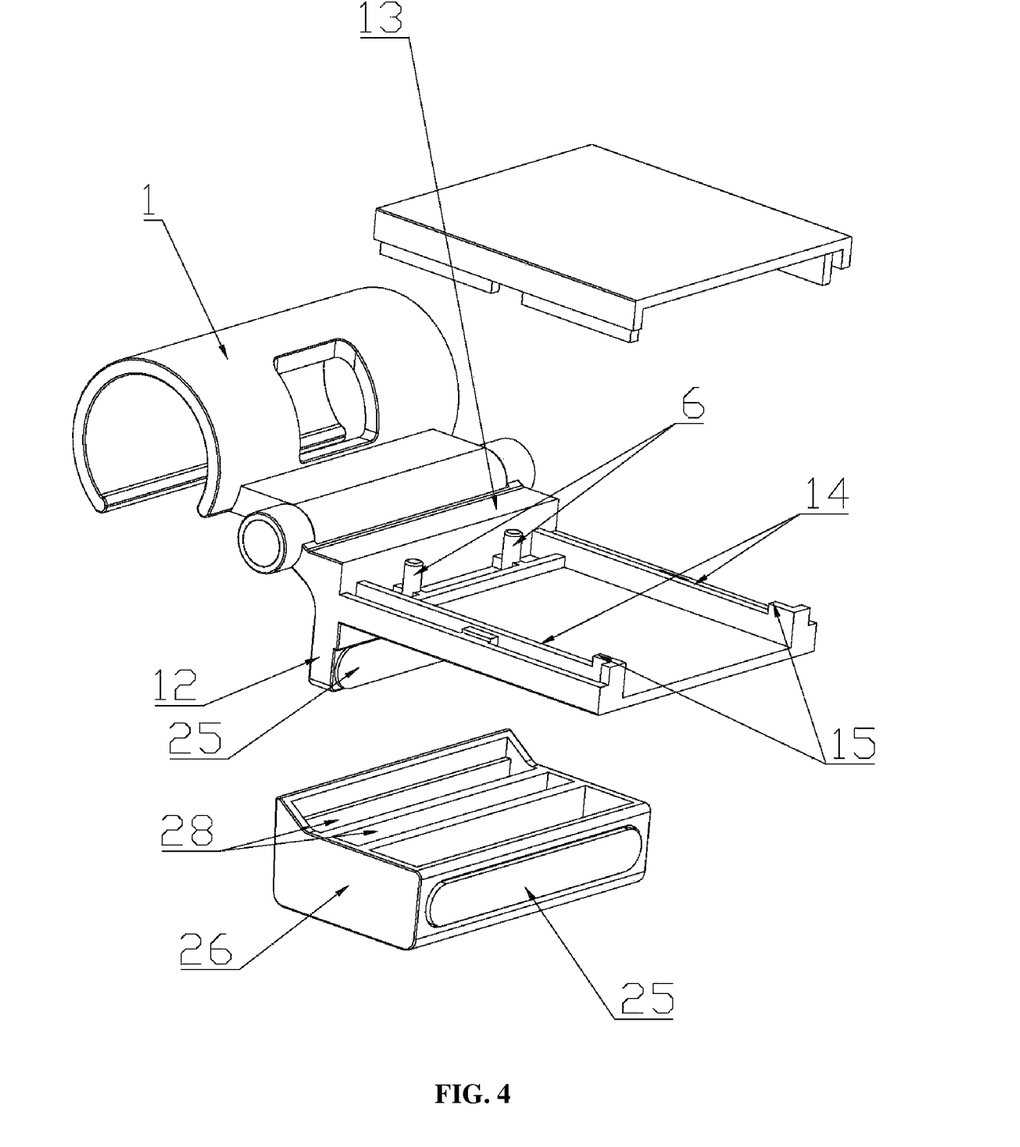
FIG. 4 is a schematic structural view of a first clamping piece and the first adjusting cover in the fixing clip of the present invention.

Preferably, a plurality of first connecting grooves 28 matching the first clamping portion 12 are formed in the first adjusting cover 26, and the plurality of first connecting grooves 28 are arranged in a direction close to or away from the second clamping portion 16.

Figure 5:
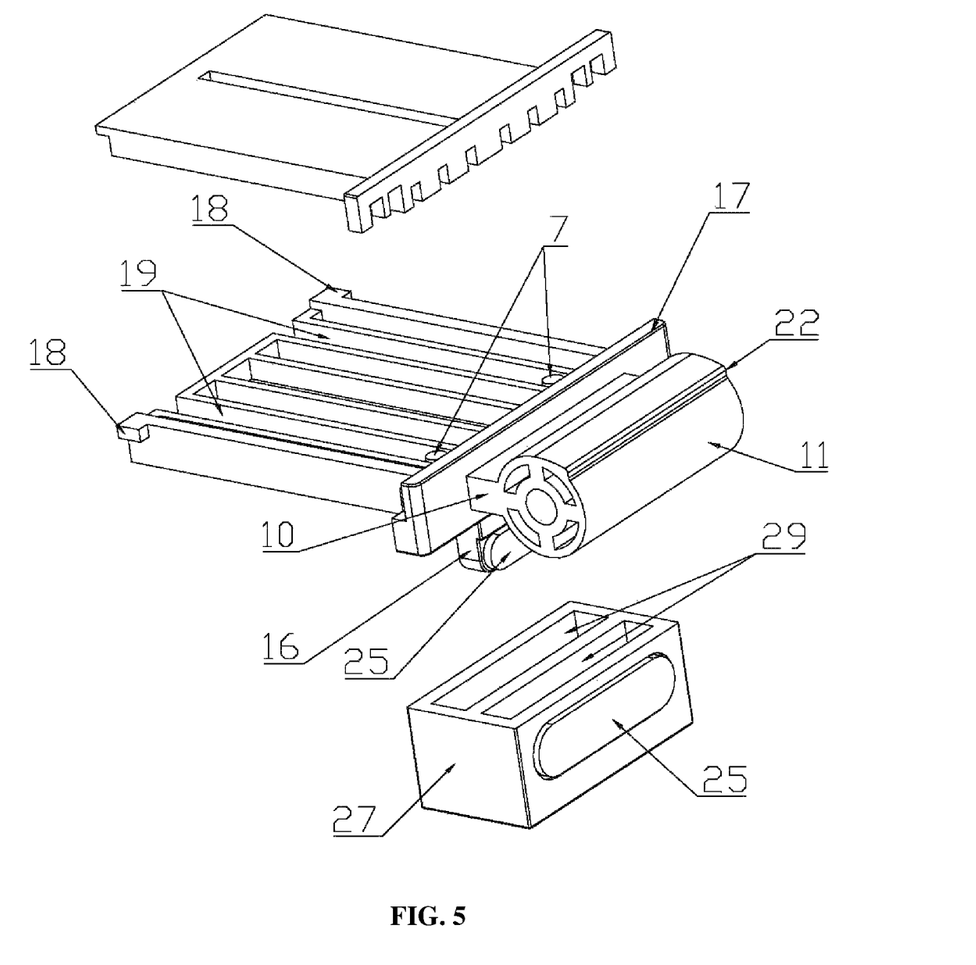
FIG. 5 is a schematic structural view of a second clamping piece and the second adjusting cover in the fixing clip of the present invention.

A plurality of second connecting grooves 29 matching the second clamping portion 16 are formed in the second adjusting cover 27, and the plurality of second connecting grooves 29 are arranged in a direction close to or away from the first clamping portion 12.

By adopting the above-mentioned structure, a user can adjust the distance between the first adjusting cover 26 and the second clamping portion 16 by means of matching of the first clamping portion 12 with different first connecting grooves 28.

The user can adjust the distance between the second adjusting cover 27 and the first clamping portion 12 by means of matching of the second clamping portion 16 with different second connecting grooves 29.

Figure 3:
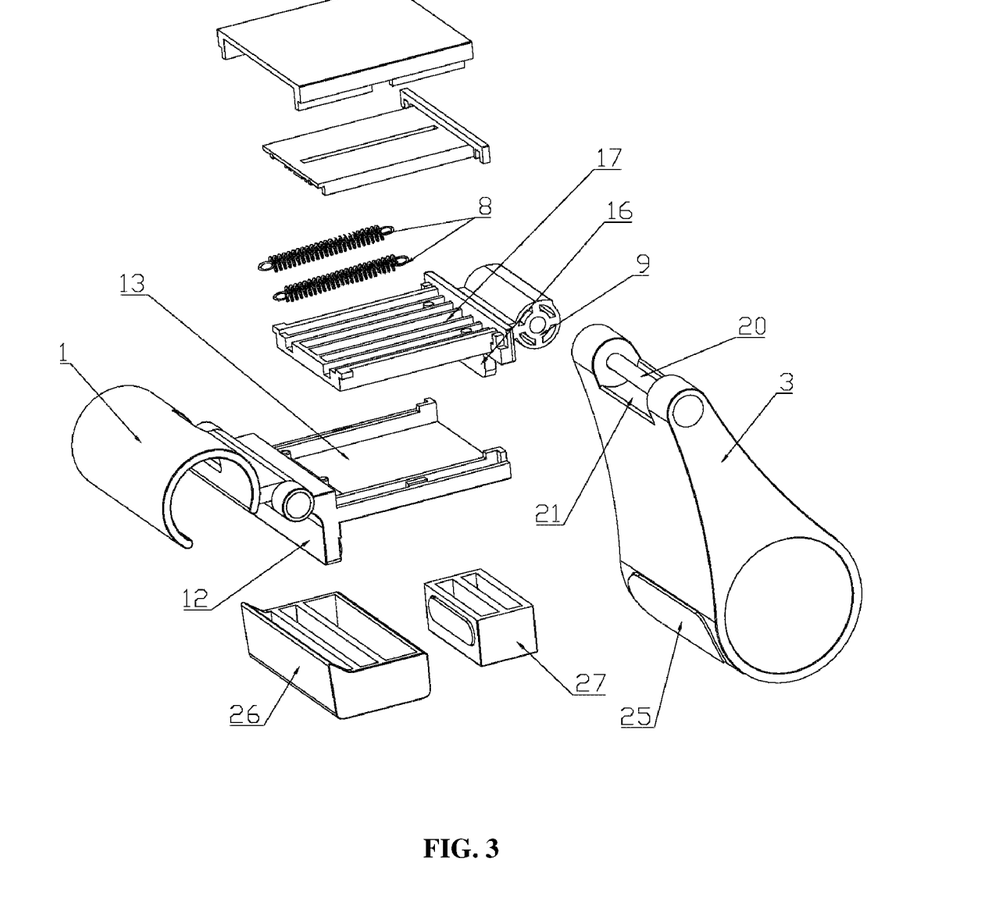
FIG. 3 is a schematic explosive structural view of the fixing clip of the present invention.

Preferably, a rubber pad 25 is provided on the inner side of the first clamping portion 12, and a sliding groove 14 and a sliding limiter 15 is provided on the first sliding connection portion 13, the second clamping body 5 includes a second clamping portion 16 and a second sliding connection portion 17, a rubber pad 25 is provided on both the left and right sides of the second clamping portion 16, the second sliding connection portion 17 is provided with a slider 18, and the second clamping portion 16 and the second sliding connection portion 17 form a clamping angle along the relative sliding direction of the first clamping body 4 and the second clamping body 5, the first sliding connection portion 13 is provided with a first spring fixing member 6, the second sliding connecting portion 17 is provided with a second spring fixing member 7, and a spring 8 is arranged between the first spring fixing member 6 and the second spring fixing member 7, whereby the second sliding connection portion 17 is provided with a spring placement groove 19, for placing the spring.

The first sliding connection portion 13 and the second sliding connection portion 17 constitute a sliding connection portion.

Both the first clamping body 4 and the second clamping body 5 are equipped with matching covers.

The first clamping portion 12 and the second clamping portion 16 are strip-shaped, and the strip-shaped design can increase the contact surface between the clamping part of the fixing clip and the clamped object.

The spring 8 is arranged to make the first clamping interval more stable when clamping the object.

Preferably, when the counterweight structure 3 is rotated until the axis of the counterweight structure 3 is parallel to the axis of the second clamping body 5, the linear distance from the end of the second clamping body 5 to the location of the sliding connection portion is less than the linear distance from the end of the counterweight structure 3 to the location of the sliding connection portion.

Preferably, the counterweight structure connecting piece 9 is provided with an integral connecting portion 10 and a counterweight connecting portion 11, wherein the integral connecting portion 10 is used for connecting the second clamping body 5 and the counterweight connecting portion 11, and the counterweight connecting portion 11 is used for connecting the counterweight structure 3.

An integral connecting portion is provided so that a distance is formed between the second clamping body and the counterweight structure, to reserve a space for the clamped object.

Preferably, the counterweight structure 3 is mounted on the counterweight connecting portion 11 through a rotating rod 20, the counterweight connecting portion 11 is a hollow cylinder, and the counterweight structure 3 is provided with a connecting hole and a rotating groove 21, wherein the counterweight connecting portion 11 is placed on the rotating groove 21, the rotating rod 20 passes through the connecting hole and the counterweight connecting portion 11, and is fixed with a threaded structure.

The counterweight structure 3 and the counterweight connecting portion 11 rotate relatively through the rotating rod 20, and are fixed by a threaded structure, so that a damping force is formed between the counterweight structure 3 and the counterweight connecting portion 11, and the counterweight structure 3 is relatively fixed and positioned. The relative rotation and fixation of the counterweight structure 3 form an angle between the weight structure 3 and the sliding connection portion which can be adjusted and fixed.

Preferably, the counterweight connecting portion 11 is provided with a rotation limiting body 22. The counterweight connecting portion protrudes outward to form a rotation limiting body 22. When the counterweight structure 3 rotates and reaches the rotation limiting body 22, the rotation limiting body 22 protrudes outward and cannot pass through the rotation groove 21 of the counterweight structure 3, thereby plays a role in limiting the rotation angle.

Preferably, the shape of the counterweight structure 3 is of small upper and large lower portion, wherein its cross section resembles a gourd shape, so that the center of gravity of the counterweight structure 3 is lowered, so the fixing clip is secured and stable.

Preferably, a rubber pad 25 is provided on the inner side of the lower end of the counterweight structure 3.

Preferably, the article connection structure 1 is rotatably arranged on the first clamping body 4.

By adopting the above-mentioned structure, the user can adjust the angle of the article connection structure 1, that is the angle of the article to be fixed, such as the light outgoing angle of the light source, by means of rotatable connection between the article connection structure 1 and the first clamping body 4.

Figure 10:
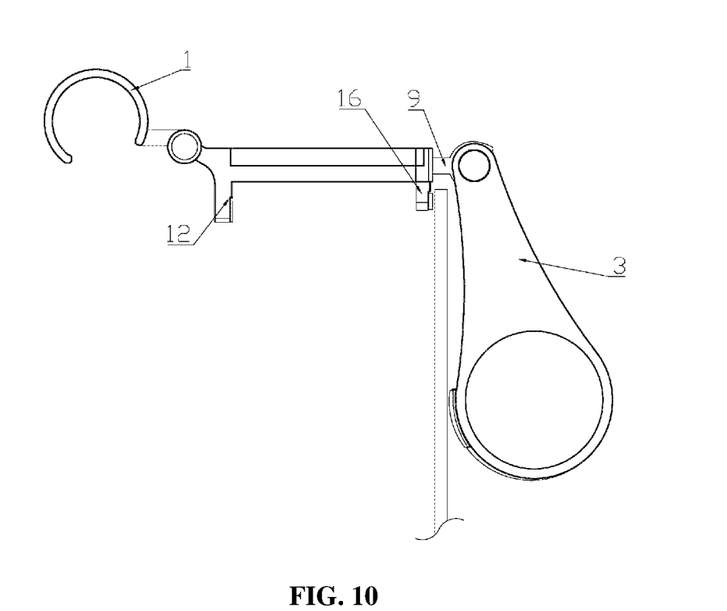
FIG. 10 is a schematic view showing that the fixing clip of the present invention is fixed to the clamped article through a second clamping interval without using the second adjusting cover.

When in use, the clamping method is determined according to the shape and thickness of the clamped object:

Method 1:

It is suitable for thinner objects to be clamped. The second clamping portion 16 of the fixing clip and the counterweight structure 3 are used to clamp the object. As shown in FIG. 10, the counterweight connecting portion 11 and the second clamping portion 16 are connected by the integral connecting portion 10, so there is a certain distance between the counterweight structure 3 and the second clamping portion 16 for clamping thinner objects.

Figure 11:
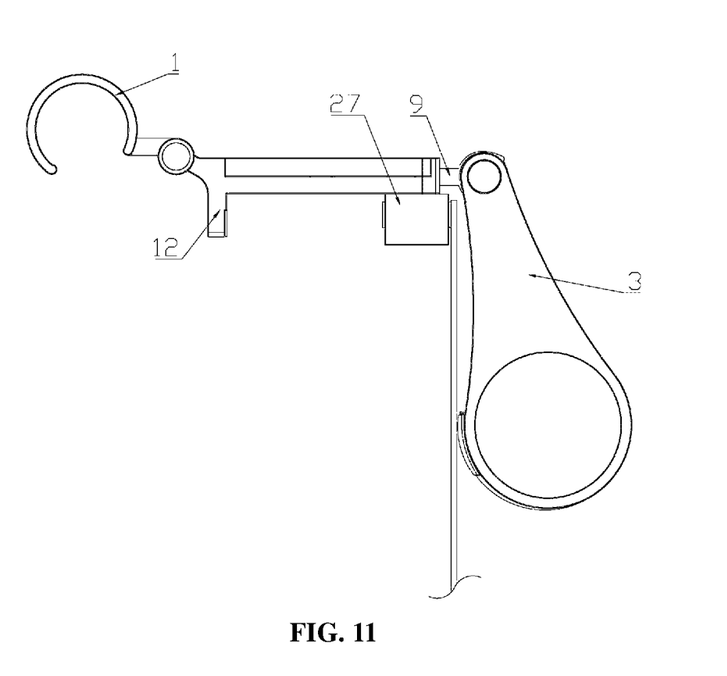
FIG. 11 is a schematic view showing that the fixing clip of the present invention is fixed to the clamped article through the second clamping interval with using the second adjusting cover.

If the object to be clamped is very thin and restricted by the integral connecting portion, the second adjusting cover 27 can be installed on the second clamping portion 16, as shown in FIG. 11.

Figure 6:
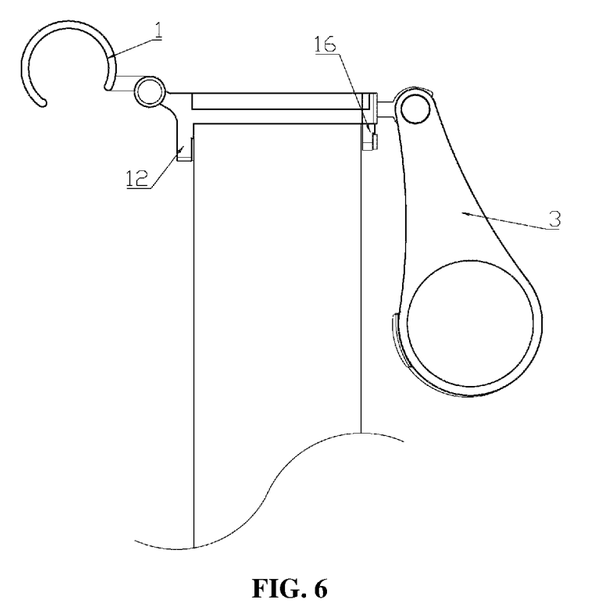
FIG. 6 is a schematic view showing that the fixing clip of the present invention is fixed to a clamped article through a first clamping interval without using the first adjusting cover and the second adjusting cover.

Method 2:

Suitable for thicker objects to be clamped. First, increase the distance between the second clamping portion 16 and the first clamping portion 12, and place it on the object to be clamped. Due to the action of the spring, the fixing clip is stably fixed on the clamped object, as shown in FIG. 6.

Figure 7:
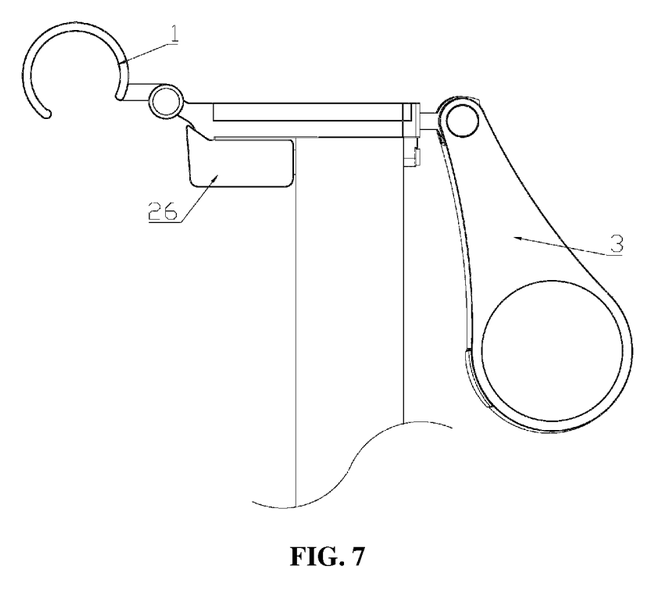
FIG. 7 is a schematic view showing that the fixing clip of the present invention is fixed to the clamped article through the first clamping interval with using the first adjusting cover and without using the second adjusting cover.
Figure 8:
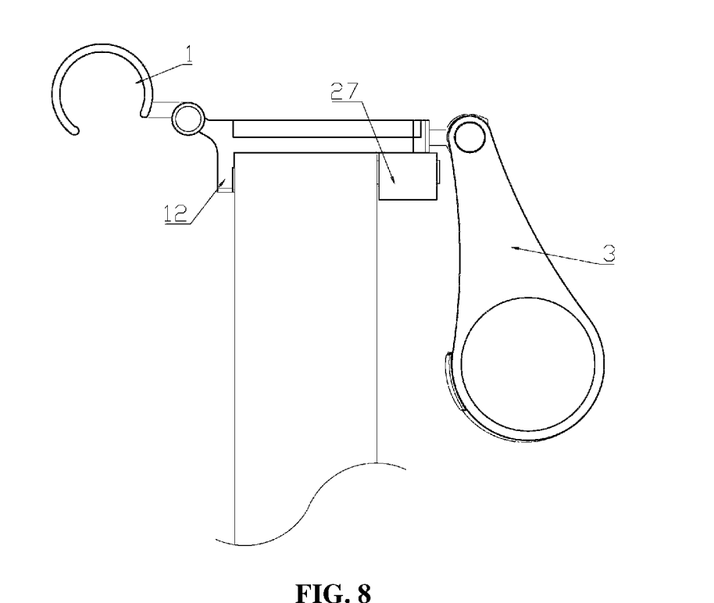
FIG. 8 is a schematic view showing that the fixing clip of the present invention is fixed to the clamped article through the first clamping interval with using the second adjusting cover and without using the first adjusting cover.
Figure 9:
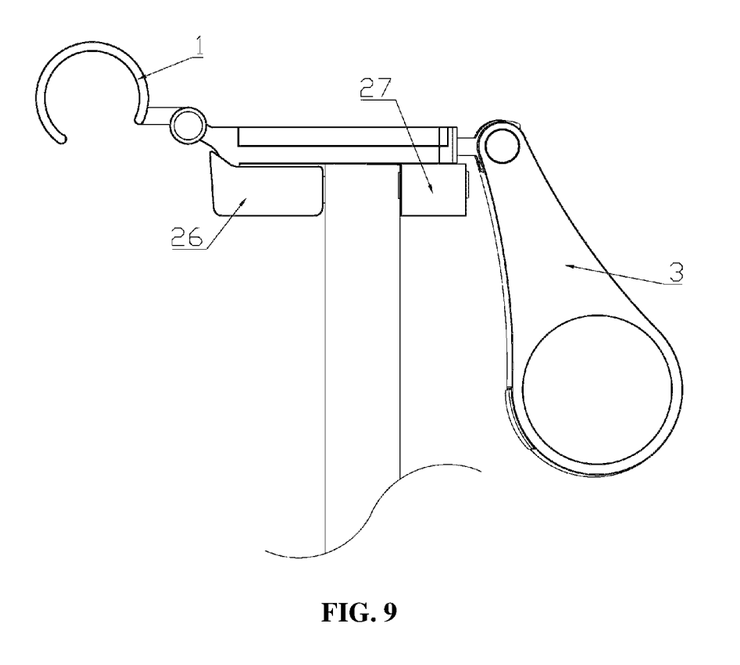
FIG. 9 is a schematic view showing that the fixing clip of the present invention is fixed to the clamped article through the first clamping interval with using the first adjusting cover and the second adjusting cover.

If the thickness of the clamped object is less than the distance between the first clamping portion 12 and the first clamping portion 12, the first adjusting cover 26 can be installed on the first clamping portion 12 and/or the second adjusting cover 27 can be installed on the second clamping portion 16, as shown in FIGS. 7-9.

Figure 14:
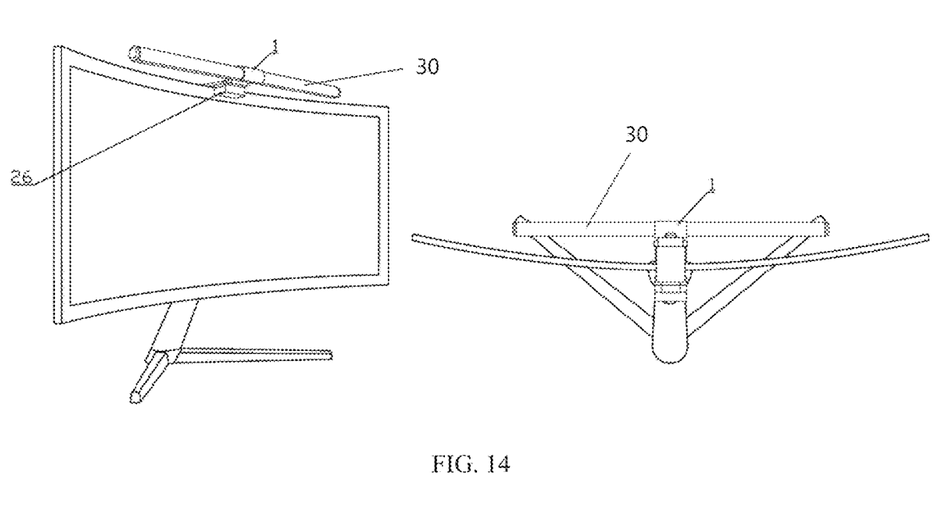
FIG. 14 is a schematic view of the fixing clip of the invention installed on a curved screen.

As shown in FIG. 14, in the state where the first adjusting cover 26 is installed on the first clamping portion 12, since the first adjusting cover 26 itself has a certain length, the distance between the article connection structure 1 and the first clamping interval is farther than that when the first adjusting cover 26 is not installed, and in this state, when the fixing clip is used for a screen hanging lamp comprising a strip-shaped lamp body 30, a light source can be farther away from the first clamping interval, which is particularly suitable for a curved screen of which the middle portion is farther away from a user side than the two ends.

Figure 12:
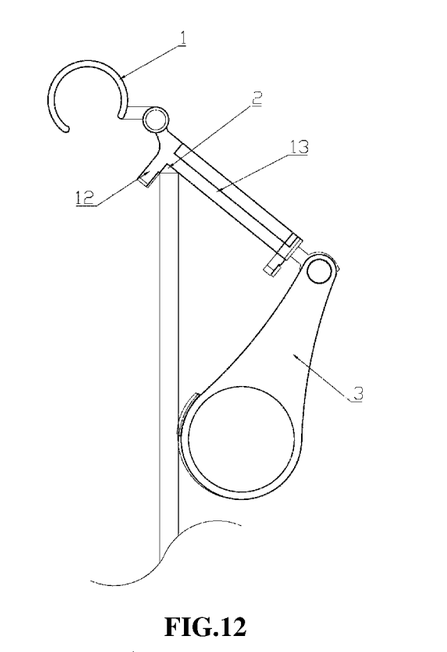
FIG. 12 is a schematic view showing that the fixing clip of the present invention is fixed to a regular clamped article through a third clamping interval.
Figure 13:
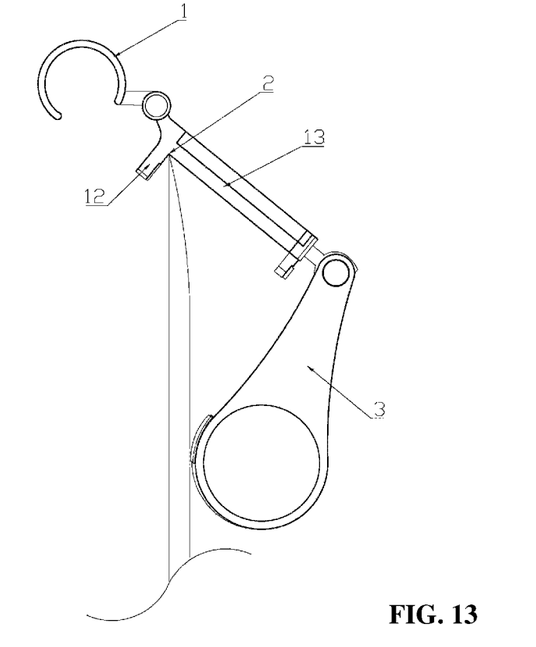
FIG. 13 is a schematic view showing that the fixing clip of the present invention is fixed to an irregular clamped article through the third clamping interval.

Method 3:

It is suitable for clamping an object of irregular shape, the clamping angle 2 is buckled to one end of the object to be clamped, and the counterweight structure is adjusted so that the fixing clip clamps the object to be clamped to achieve fixation, as shown in FIG. 13. This method can be applied to clamp regular-shaped objects, as shown in FIG. 12.

Since the counterweight structure adopts a rotatable connection mode, the angle between the object connected by the object connection structure and the clamped object can be realized by adjusting the rotation of counterweight.

The present invention is particularly suitable for screen display lamps. The present invention can stably fix the screen display lamps on monitors of different thicknesses. The article connecting structure 1 of the fixing clip is clamped and connected to the screen display lamp. The fixing clip is fixed on the monitor through the clamping structure 2, and the connection portion of the article connection structure 1 is arranged in a cylindrical structure matching the direction of the screen display lamp. The cylindrical structure has a certain elasticity and can stably fix the screen display lamp. Meantime, the cylindrical structure is also provided with a through hole for connection of the power cord of the screen display lamp. Due to the design of the cylindrical structure, the screen display lamp can be appropriately rotated to adjust the angle during application.

The length of the sliding connection portion and the spring are set according to the thickness of the desktop monitor on the market, and the length of the integral connection portion in the counterweight structure connection piece is set according to the thickness of the notebook monitor on the market.

Preferably, method 1 is suitable for notebook monitors of thickness between 1 mm and 5 mm. If the thickness of the notebook monitor is between 1 mm and 3 mm, an adjusting cover 23 needs to be installed.

Method 2 is suitable for desktop computer monitors with a thickness between 1.5 cm and 3.5 cm. If the thickness of the desktop computer monitor is between 1.5 cm and 2.8 cm, an adjustment cover must be installed.

Method 3 is applicable to irregularly shaped monitors, and it can be applied to monitors of different thicknesses.

The above are only the preferred embodiments of the present invention. It should be pointed out that for those of ordinary skill in the art, several improvements and modifications can be made without departing from the technical principles of the present invention, and these improvements and modifications should also be regarded as the protection scope of the present invention.

What is claimed is:

1. A fixing clip, comprising an article connection structure, a first
    clamping body, a second clamping body and a counterweight structure arranged in sequence, the article connection structure being used to connect articles to be fixed, and the article connection structure being arranged on the first clamping body;
    the second clamping body and the first clamping body being relatively slidably connected to form a first clamping interval with adjustable clamping width;
    the end of the second clamping body being provided with a counterweight structure connecting piece, and the counterweight structure being installed on the counterweight structure connecting piece, wherein the counterweight structure and the counterweight structure connecting piece can be relatively rotated or fixed, and a second clamping interval is formed between the counterweight structure and the second clamping body;
    the first clamping body comprising a first clamping portion and a first sliding connection portion, and the first clamping portion and the first sliding connection portion forming a clamping angle, wherein a third clamping interval is formed between the clamping angle and the counterweight structure;
    the fixing clip comprising an adjusting cover.

2. The fixing clip according to claim 1, wherein the second clamping body comprises a second clamping portion and a second sliding connection portion; the adjusting cover comprises a first adjusting cover detachably connected to the first clamping portion, and a second adjusting cover detachably connected to the second clamping portion.

3. The fixing clip according to claim 2, wherein a plurality of first connecting grooves matching the first clamping portion are formed in the first adjusting cover, and the plurality of first connecting grooves are arranged in a direction perpendicular to the second clamping portion;
    a plurality of second connecting grooves matching the second clamping portion are formed in the second adjusting cover, and the plurality of second connecting grooves are arranged in a direction perpendicular to the first clamping portion.

4. The fixing clip according to claim 3, wherein an extending direction of the first connecting groove is parallel with an extending direction of the second connecting groove.

5. The fixing clip according to claim 1, wherein a rubber pad is provided on the inner side of the first clamping portion, and a sliding groove and a sliding limiter is provided on the first sliding connection portion, the second clamping body includes a second clamping portion and a second sliding connection portion, a rubber pad is provided on both the left and right sides of the second clamping portion, the second sliding connection portion is provided with a slider, and the second clamping portion and the second sliding connection portion form a clamping angle along the relative sliding direction of the first clamping body and the second clamping body, the first sliding connection portion is provided with a first spring fixing member, the second sliding connecting portion is provided with a second spring fixing member, and a spring is arranged between the first spring fixing member and the second spring fixing member, whereby the second sliding connection portion is provided with a spring placement groove.

6. The fixing clip according to claim 1, wherein the counterweight structure connecting piece is provided with an integral connecting portion and a counterweight connecting portion, wherein the integral connecting portion is used for connecting the second clamping body and the counterweight connecting portion, and the counterweight connecting portion is used for connecting the counterweight structure.

7. The fixing clip according to claim 6, wherein the counterweight structure is mounted on the counterweight connecting portion through a rotating rod, the counterweight connecting portion is a hollow cylinder, and the counterweight structure is provided with a connecting hole and a rotating groove, wherein the counterweight connecting portion is placed on the rotating groove, the rotating rod passes through the connecting hole and the counterweight connecting portion, and is fixed with a threaded structure.

8. The fixing clip according to claim 7, wherein the counterweight connecting portion is provided with a rotation limiting body.

9. The fixing clip according to claim 1, wherein the shape of the counterweight structure is of small upper and large lower portion.

10. The fixing clip according to claim 1, wherein a rubber pad is provided on the inner side of the lower end of the counterweight structure.

11. The fixing clip according to claim 1, wherein the article connection structure is rotatably arranged on the first clamping body.

12. A fixing clip comprising an article connection structure, a first clamping body, a second clamping body and a counterweight structure arranged in sequence, the article connection structure being used to connect articles to be fixed, and the article connection structure being arranged on the first clamping body;
    the second clamping body and the first clamping body being relatively slidably connected to form a first clamping interval with adjustable clamping width;
    the end of the second clamping body being provided with a counterweight structure connecting piece, and the counterweight structure being installed on the counterweight structure connecting piece, wherein the counterweight structure and the counterweight structure connecting piece can be relatively rotated or fixed, and a second clamping interval is formed between the counterweight structure and the second clamping body;

the first clamping body comprising a first clamping portion and a first sliding connection portion, and the first clamping portion and the first sliding connection portion forming a clamping angle, wherein a third clamping interval being formed between the clamping angle and the counterweight structure;

the article connection structure being rotatably arranged on the first clamping body.

13. A fixing clip comprising an article connection structure, a first clamping body, a second clamping body and a counterweight structure arranged in sequence, the article connection structure being used to connect articles to be fixed, and the article connection structure being arranged on the first clamping body;

the second clamping body and the first clamping body being relatively slidably connected to form a first clamping interval with adjustable clamping width;

the end of the second clamping body being provided with a counterweight structure connecting piece, and the counterweight structure being installed on the counterweight structure connecting piece, wherein the counterweight structure and the counterweight structure connecting piece can be relatively rotated or fixed, and a second clamping interval is formed between the counterweight structure and the second clamping body;

the first clamping body including a first clamping portion and a first sliding connection portion, the first clamping portion and the first sliding connection portion forming a clamping angle, and a third clamping interval being formed between the clamping angle and the counterweight structure;

the article connection structure being used to connect a strip-shaped lamp body.

14. The fixing clip according to claim 13, wherein the cross section shape of the strip-shaped lamp body is square or circular.

* * * * *